(12) United States Patent
Carle

(10) Patent No.: US 6,213,749 B1
(45) Date of Patent: Apr. 10, 2001

(54) DEVICE FOR REFINING A CONFECTIONARY MATERIAL

(75) Inventor: Giovanni Marco Carle, Milan (IT)

(73) Assignee: Carle & Montanari S.p.A., Milan (IT)

( * ) Notice: Subject to any disclaimer, the term of this patent is extended or adjusted under 35 U.S.C. 154(b) by 0 days.

(21) Appl. No.: 09/298,874

(22) Filed: Apr. 26, 1999

(30) Foreign Application Priority Data

Apr. 30, 1998 (IT) ............................................. MI98A0939

(51) Int. Cl.[7] .................................................. B29C 45/80
(52) U.S. Cl. ........................ 425/141; 425/149; 425/363; 425/367
(58) Field of Search .................... 425/141, 149, 425/150, 363, 367

(56) References Cited

U.S. PATENT DOCUMENTS 3,901,635 * 8/1975 Greenberger .......................... 425/367
4,639,346 * 1/1987 Pav et al. .............................. 425/143

\* cited by examiner

Primary Examiner—Tim Heitbrink
(74) Attorney, Agent, or Firm—Kirschstein, et al.

(57) ABSTRACT

An arrangement for refining a confectionery material includes a series of cylinders for pressing and stretching the confectionery material particles, driving devices for driving the cylinders, and heat removal devices for removing the refining heat. Between the freely swinging first cylinder and the second cylinder, a position transducer for measuring the spacing between the first two cylinders is arranged. The first cylinder is pressed against the second cylinder and a spreading-apart force transducer measures the force between the two cylinders. Temperature transducers for measuring the temperature near the confectionery material refined by the first two cylinders are moreover provided. The transducers are operatively coupled to a control device which provides a reference signal for the cylinder feedback driving device.

12 Claims, 3 Drawing Sheets

DEVICE FOR REFINING A CONFECTIONARY MATERIAL

BACKGROUND OF THE INVENTION

The present invention relates to a method and device for refining a confectionery material, such as chocolate.

As is known, a confectionery material is conventionally refined by granulometrically reducing the mass thereof. Such a granulometric reduction is performed by causing the confectionery material to pass through a series of cylinders or rollers pressing the material particles, by applying a pressure to the end supports of the laminating cylinders, and stretching said particles in the cylinder laminating nip, the cylinders defining the laminated nip being driven with different speeds.

The confectionery material refining devices are generally arranged in continuous production lines, for example in the lines of a patterning system.

For managing in a simple manner such a making line, the confectionery material, as is known, must exit the refining machine with a constant amount and a constant or even granulometric quality.

Also known is the fact that a manual adjustment of the refining process parameters does not allow to provide a constant refined product quality and rate, since this manual adjustment does not operate with a sufficient speed on the refining process.

In order to overcome the above mentioned drawback, available confectionery material refining machines comprise adjusting devices for adjusting the revolution speed of the refining or laminating cylinders, said adjusting devices adjusting, based on the thickness of the refined product exiting said series of cylinders, the laminating speeds.

The above confectionery material refining machine, however, is affected by reliability and accuracy problems.

In particular, the adjustment of the refining process based on the measurement of the thickness or film of the confectionery product exiting the cylinders would involve the provision of mechanical elements contacting the confectionery material, with a consequent problem of soiling the system, thereby requiring complex maintenance operations.

Moreover, the refined confectionery product has a thickness in the 15–20 $\mu$m range, which can be only detected by using very accurate thickness detecting devices.

On the other hand, available thickness detecting devices are unsuitable to provide a continuous operation as necessary in the mentioned systems and, moreover, they are negatively affected by hard conditions such as the presence of powder and fat as well as by the high sliding speed of the confectionery mass at the outlet of said cylinders the last of which can revolve with a revolution speed of the order of 400 RPM's.

Moreover, the above mentioned machines, because of their high operating speeds, are affected by vibrations and oscillations which make the measurement system unstable.

SUMMARY OF THE INVENTION

Accordingly, the aim of the present invention is to overcome the drawbacks of the prior art by providing a method and a device for refining confectionery materials, so as to provide a refined product having a sufficient evenness, thereby allowing said device to be included in continuously operating confectionery material patterning systems.

For making said refined product in an even amount, it would be necessary to form a product film having an end even thickness, with a product outlet rate and a peripheral rate of the last cylinder as even as possible.

The aim of the invention is achieved by a method for refining a confectionery material, in which the particles of said material are pressed and stretched between a series of cylinders, characterized in that said method comprises the steps of measuring the distance between the feeding cylinders, comparing the measured distance with a reference distance by setting a distance variation value between said feeding cylinders, measuring the spreading-apart force provided by the material passing through said feeding cylinders, defining, based on the distance variation value and the spreading-apart force of the feeding cylinders, a rated turning speed of the first feeding cylinder so as to adjust the revolution speed of said first feeding cylinder by using the measurement of the revolution speed thereof as a feedback parameter.

Thus, as the consistency of the confectionery material supplied to the refining machine varies, the revolution speed or rate of the first cylinder is suddenly changed. Such a controlled variation of the revolution speed of the first cylinder will provide an unchanged spreading-apart force between the feeding cylinders, thereby providing a desired size evenness of the laminating cylinder nip size, and an even laminating gap or nip. This adjustment is performed without changing the revolution speeds of the cylinders after the first, thereby providing a refined product in a constant amount.

For recovering the revolution speed of the first feeding cylinder to optimum values for the driving device, based on a preset optimum revolution speed for the first feeding cylinder, a desired temperature of said feeding cylinders is set, thereby adjusting the temperature of the confectionery material passing through the feeding cylinder by using said temperature as an adjustment feedback parameter.

By changing said temperature, it is possible to modify the consistency or viscosity of the confectionery material mass, thereby allowing the revolution speed of the first feeding cylinder to recover its optimum values. Such an adjustment, based on the confectionery mass temperature variation, is characterized by a response time much longer than that of the refining process response to revolution speed variations of the first laminating cylinder, and, accordingly, can be performed at a delayed time, due to the high thermal inertia of the refining device and of the confectionery material being processed.

For defining the desired temperature value allowing to recover the revolution speed of the first laminating cylinder to its preset optimum value, said desired temperature value is defined or set by changing the temperature measured in the laminating cylinders by subsequent increments or decrements, in a preset amount, thereby providing a revolution speed of the first laminating cylinder equal to the preset optimum revolution speed value.

By changing at preset time intervals the value of the laminating cylinder temperature, it is possible to modify the consistency of the confectionery material being processed or laminated.

Accordingly, it is possible to modify the spreading-apart force between the cylinders.

The variations of the spreading-apart force will affect, in turn, the first cylinder revolution speed adjusting system, thereby recovering the revolution speed values to said preset optimum value.

By recovering the revolution speed value of the first cylinder to optimum values, the adjusting system is enabled to operate again for adjusting further variations of the confectionery mass quality supplied to the refining machine.

Thus, the first cylinder revolution speed adjusting system can be designed to change said revolution speed within a small value range, the values whereof will be adapted to provide a very efficient driving system as well as low power consumption.

Advantageously, for providing a more accurate measurement of the distance or gap of the feeding cylinders, said distance is detected at a plurality of detecting points along the feeding cylinder revolution axes, such as at the two end portions of the feeding cylinders, near the supports thereof.

The device for achieving the aim according to the disclosed method, is provided with a series of laminating cylinders, feedback controlled driving devices for said cylinders, in which the first cylinder is swingably supported with respect to the second cylinder and urged against said second cylinder, said device being characterized in that between the feeding cylinders a transducer for detecting the distance of said feeding cylinders and a transducer for detecting the spreading-apart force thereof are arranged, that said position and spreading-apart force transducers are operatively coupled to a control device, and that said control device is operatively coupled to said feedback controlled driving device for rotatively driving said first feeding cylinder.

For providing, in addition to an adjustment of the revolution speed of the first feeding cylinder, a contemporaneous adjustment of the temperature of the confectionery material mass being refined between the feeding cylinders, said control device is operatively coupled to a temperature adjusting device for adjusting the temperature of said cylinders, said temperature adjusting device being feedback controlled by a temperature transducer or sensor as provided in the feeding cylinders.

By the disclosed approach it is possible to modify the temperature of the feeding cylinders to change the consistency of the confectionary mass being processed. Such a variation causes a corresponding variation of the cylinder spreading-apart force and, hence, of the distance of said feeding cylinders. The consistency variation is adjusted by a suitable and sudden variation of the revolution speed of the first cylinder, thereby affecting the average confectionery material feeding or supplying speed, to provide an even throughput of the refined mass.

Such an adjustment is performed so suddenly that the pressure applied to the feeding cylinders is not substantially changed thereby said cylinders are held in substantially optimal parallel conditions.

Advantageously, between the first two cylinders a hydrostatic or hydrodynamic load applying system allowing the first cylinder, swingably supported with respect to the second fixed cylinder, to compensate for the abrupt load variations, is provided.

The disclosed method and device provide the advantage, with respect to the prior art, of defining or setting the thickness of the made film by measuring the distance between the axes of the first feeding cylinders.

At first, this measurement is performed outside of the working zone, without soiling the device and, accordingly, with a less maintenance requirement.

Moreover, by advantageously performing said measurement near the end portions of the axes of the two first cylinders, it is possible to provide an average of at least two measurement points thereby more accurately defining the variations of the feeding gap or nip between the first two cylinders.

A further advantage is that the detection of the distance between the first two cylinders provides a greater reliability and accuracy. In fact, the revolution speed of the first cylinder (of about 80 RPM's) will be much smaller than that of the last refining or laminating cylinders.

Accordingly, the vibrations and oscillations affecting the distance measurement will be very small.

Moreover, the distance value to be measured between the first two cylinders (i.e. the thickness of the produced film) will be of about 100 $\mu$m, instead of a 20 $\mu$m thickness of the already refined product exiting the refining device.

These different distance values will allow a simpler and more accurate measurement to be performed.

Accordingly, the greater value of the distance to be measured will allow greater measurement tolerances, while providing an end refined product of high quality.

In fact, by measuring the distance or gap between the two first cylinders, the end product will be minimally affected, since a possible measurement error, as referred to the exiting product, will be reduced by a factor equal to the revolution ratio of the second and last cylinders, which ratio, for example, varies from ¼ to ¹⁄₁₀.

Accordingly, it will be advantageously possible to use, instead of optical rule or strip transducers, linear potentiometers or other types of transducers or sensors based on a like principle and which are commonly available on CNC machine tools.

A further advantage is the possibility of changing the temperature of the feeding cylinders and, accordingly, of the material being processed between the first two cylinders. Thus, it is possible to change the consistency of the confectionery material and, accordingly, hold the revolution speed of the first cylinder within value ranges allowed by the driving device thereof.

Accordingly, as the working conditions are changed, the control system will affect the temperature of the two feeding cylinders, by increasing or decreasing it to change, even if slowly, the consistency of the confectionery material and, hence, the gripping force of the laminating cylinders on the product.

Accordingly, it is possible to gradually recover the value of the peripheral revolution speed of the first cylinder to the starting conditions thereof, thereby providing an evenly broad operating range adapted to efficiently operate even in a case of a great variation of the operating conditions of the upstream line and easily affecting the characteristics of the mass being refined.

BRIEF DESCRIPTION OF THE DRAWINGS

The subject matter of the present invention will be hereinafter disclosed and illustrated in a more detailed manner by an exemplary embodiment thereof, with reference to the accompanying drawings, where.

DESCRIPTION OF THE PREFERRED EMBODIMENTS

Since the construction and operation of the confectionery material refining device are well known, in the following disclosure only the novel parts thereof, essential for understanding the present invention, will be disclosed.

Figure 1:
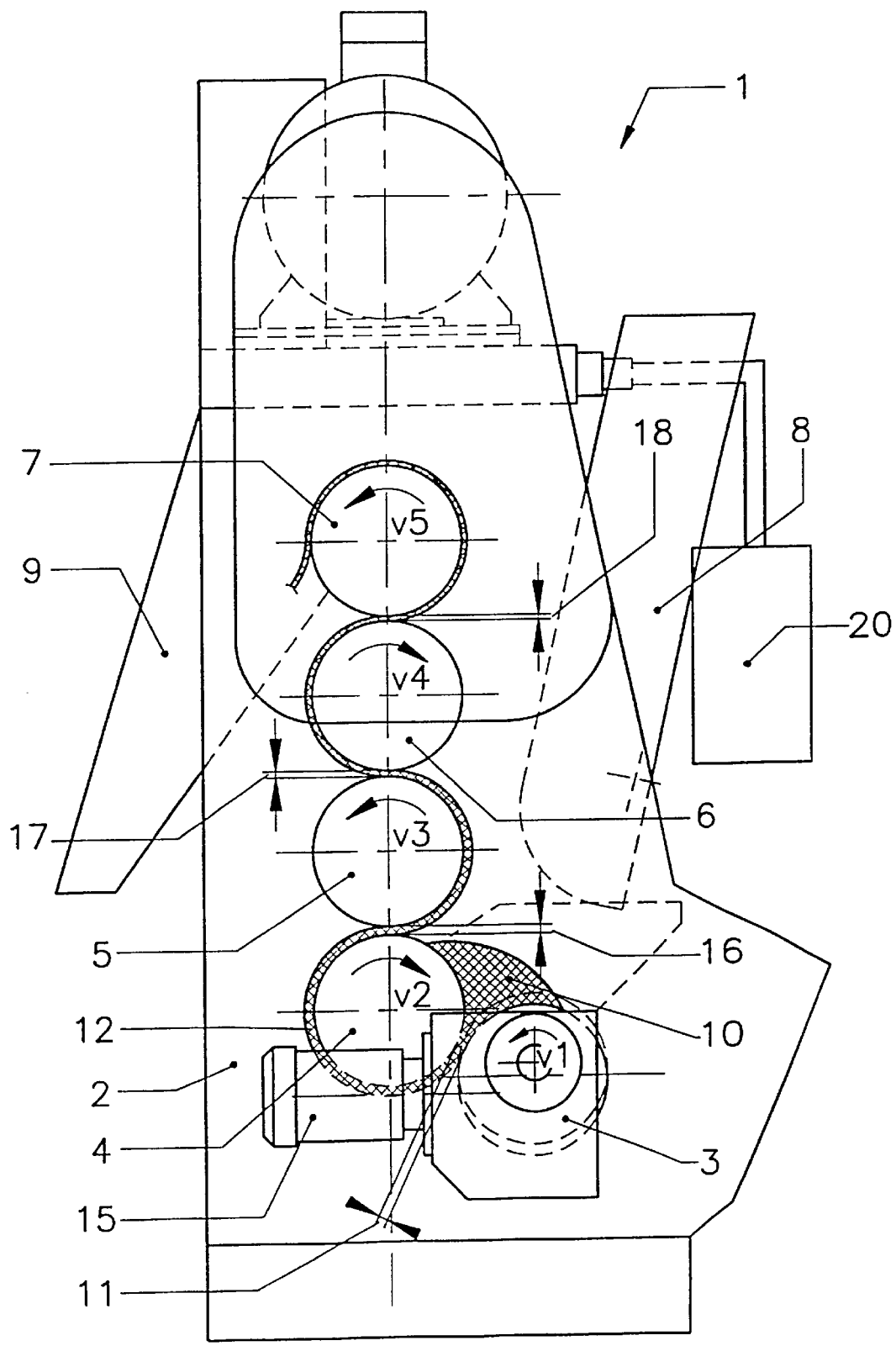
FIG. 1 is a side view illustrating a 5-cylinder confectionery material refining device.

In FIG. 1 a five-cylinder refining device or machine has been generally indicated by the reference number 1.

Said refining device or machine comprises a holding casing 2, for example of a box-like type, supporting in its inside laminating cylinders 3, 4, 5, 6, 7 which are arranged in a parallel adjoining relationship.

On a side of the laminating cylinders 3, 4, 5, 6, 7, feeding 8 and unloading 9 devices are provided.

The feeding device 8 conveys the confectionery material mass 10 to be refined to the bottom of the refining device 1, at the two laminating cylinders 3 and 4 thereof which, accordingly, are called "feeding cylinders".

The confectionary material mass 10, passing through the laminating nip 11 of the first cylinders 3, 4, is spread along the overall length of said cylinders 3, 4 thereby forming a product film 12 which, by passing through the following series of cylinders 4, 5, 6 , 7, will be refined and reduced in thickness.

The confectionery material film 12, upon passing through the series of cylinders 3, 4, 5 , 6, 7, will be supplied to the unloading device 9 provided for feeding, for example, a basin or "conch" of the processing line (not shown).

The laminating cylinders 3, 4, 5, 6, 7 are operatively coupled to driving devices therefor.

For example, the first feeding cylinder 3 is coupled to a motor reducing unit 15, allowing to change the revolution speed V1 thereof and, accordingly, the feeding speed of the confectionery material mass 10.

It would be possible to provide different revolution speeds or rates V1, V2, V3, V4, V5 for each laminating cylinder 3, 4, 5, 6, 7, said laminating cylinders 3, 4, 5, 5, 6, 7 being adjustably supported by said supporting casing 2.

By adjusting the positions of the supports of said laminating cylinders 3, 4, 5, 6, 7, it is possible to change the laminating nips or gaps 16, 17, 18 defined between the cylinders 4, 5, 6, 7.

The driving and adjusting devices, in turn, are operatively coupled to a control unit 20.

Figure 2:
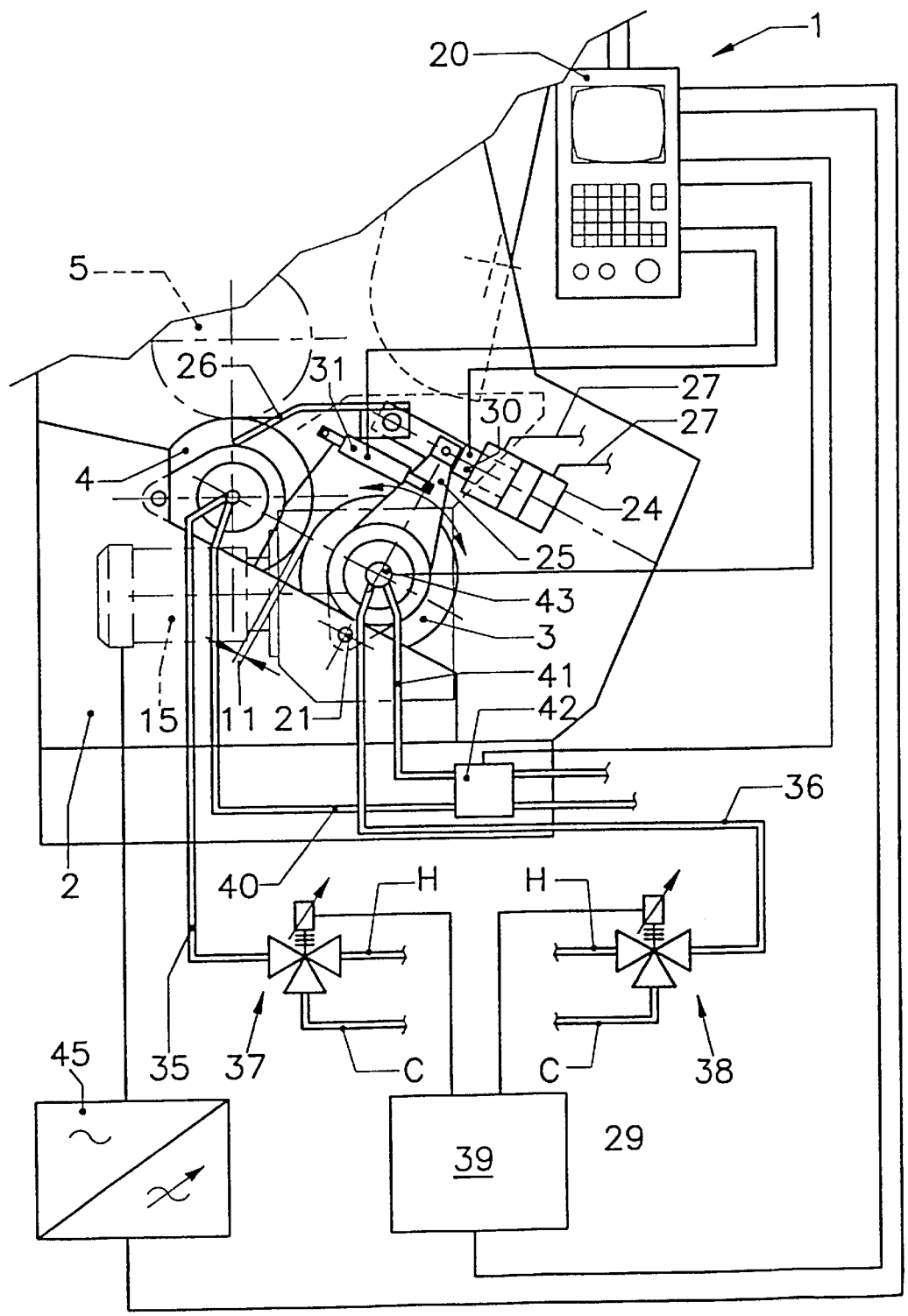
FIG. 2 is a further schematic side view, as partially cross-sectioned, illustrating the confectionery material feeding cylinder control and adjusting devices.

FIG. 2 illustrates the constructional details of the adjusting devices for the first two feeding cylinders 3, 4.

The first feeding cylinder 3 is swingably supported about a pivot pin 21 rigid with the box-like casing 2 of the machine 1, and the first feeding cylinder 3 is pressed against the second cylinder 4.

For example, a pair of hydraulic devices 24, or of hydrostatic or hydrodynamic devices, are operatively coupled to levers 25 rigid with the end portions of the feeding cylinder 3, thereby causing said first cylinder 3 to swing against the second cylinder 4.

The outer casing of the hydraulic devices is coupled to a second lever 26 provided at the end portion of the second feeding cylinder 4.

The hydraulic device 24 is supplied by a controllable hydraulic circuit 27.

Between the piston of the hydraulic device 24 and an articulated coupling support for connecting the lever 25 of the first cylinder 3, a spreading-apart force transducer or sensor 30 is arranged. The spreading-apart force transducer 30, for example, a load cell, is operatively coupled to said control unit 20.

Between the two feeding cylinders 3, 4 position detecting or sensing devices 31 are provided. For example, linear potentiometers are coupled, at the end portions thereof, to the levers 25, 26 provided on the sides of the feeding cylinders 3, 4 and supporting said hydraulic device 24.

Preferably, the position transducer 31 is operatively coupled to the end portions of the feeding cylinder 3, 4 supports, thereby the connecting points thereof will coincide with the revolution or rotary axes of the cylinders 3, 4.

The position transducer 31 is operatively coupled to said control unit 20.

Inside said laminating cylinders 3, 4, 5, 6, 7 an adjusting device for adjusting the temperature of the confectionery mass being defined is arranged.

For example, in the inside of said laminating cylinders 3, 4, 5, 6, 7 a hydraulic circuit is provided.

FIG. 2 illustrates the end portions of the lines of the cooling hydraulic circuits of the first two feeding cylinders 3, 4.

The delivery lines or ducts 35, 36 are coupled to three-way servo valves 37, 38.

The servovalves 37, 38 are coupled to ducts which are supplied with a hot fluid (H) and a cool fluid (C).

Said servovalves 37, 38 are operatively coupled to a driving or actuating device 39.

The actuating device 39 of said servovalves 37, 38 is in turn operatively coupled to the control unit 20.

Temperature transducers or sensors are arranged near the confectionery mass laminated by the first two cylinders 3, 4.

For example, temperature transducers (not shown) are arranged in the hydraulic circuit ducts or lines provided in the feeding cylinders 3, 4, thereby allowing to measure the temperature of the fluid passing through the hydraulic circuit inside said cylinders 3, 4.

The temperature transducers are operatively coupled to the control unit 20.

A speed transducer 43 is operatively coupled to the rotary shaft of the feeding cylinder 3.

The detecting or transducing device 43 for detecting the rotary or revolution speed of the feeding cylinder 3, for example a resolver, is operatively coupled to the control unit 20.

Said swinging feeding cylinder 3 is operatively coupled to the motor reducing unit 15.

Said motor reducing unit 15 is controlled by a drive 45 operatively coupled to said control unit 20.

Figure 3:
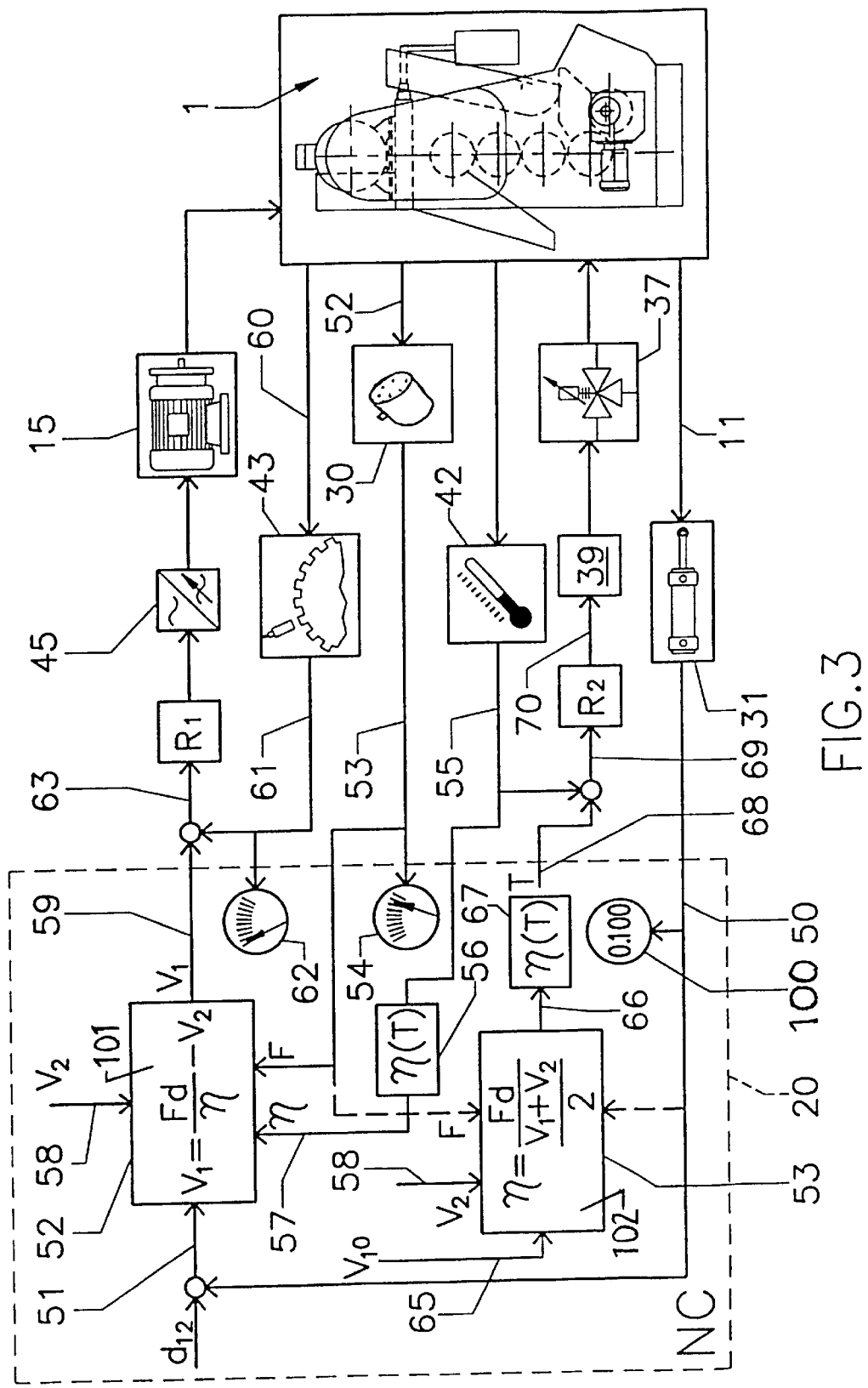
FIG. 3 is a block diagram illustrating a method for adjusting the distance or gap between the first two cylinders, as well as their temperature.

FIG. 3 illustrates the operating control logic for controlling the confectionery material mass refining process.

In order to better understand said refining process or method, it is deemed as indispensable to disclose the parameters affecting said method and the confectionery material refining step proper on the processing line.

The quality and amount of the refined product will depend on the thickness of the laminating gaps or nips of the laminating cylinders and the peripheral revolution speeds thereof.

The first nip or gap formed between the first two cylinders, or feeding cylinders, will allow to distribute the product all along the length of the cylinders thereby allowing to adjust the product being fed to the top cylinders. From the second laminating nip to the last, the granulometric reduction proper of the confectionery material mass is performed. In said subsequent laminating steps, a constant relationship between the ratios of the peripheral revolution speeds of the cylinders $V_n$ and the thickness ratios of the thicknesses Xn of the laminated product film will be held. More specifically, by evaluating this relationship between the last and second laminating cylinders, we will have:

$$\frac{X2}{X_n} = \frac{V_n}{V_2}$$

Accordingly, it is possible to provide a refined product of set quality and amount, by only changing the working or processing conditions upstream of the cylinder series.

Thus it is possible to independently adjust the revolution speed of the first feeding cylinder in order to either increase or decrease the fed product amount, and preserve the desired end granulometry downstream of the cylinder series.

The confectionery material refining method or process provides for a strict relationship between the mechanical parameters of the refining device and the confectionery mass consistency.

In particular:

$$F = \frac{\eta \frac{V_1 + V_2}{2}}{d} C$$

where F represents the load between the refining cylinders, d represents the distance of the cylinders or laminating nip or gap, V represents the peripheral revolution speed of the cylinders involved in the refining step, M represents the consistency or viscosity of the confectionery mass and C represents a proportionality constant.

A confectionary mass viscosity or consistency M will also depend on the temperature of the refining process.

A variation of said parameters (F, V, M, d, T) would cause a corresponding variation of the refined product quality and amount.

A variation of the spreading-apart force F or load between the refining cylinders could cause negative effects, since it would contribute to a mechanical deformation of the laminating cylinders, thereby preventing them from being properly arranged.

In fact, the laminating cylinder mantle or shell is not perfectly cylindric, but has a crowned contour to counter-balance the pressing there against of the product being laminated, thereby resiliently deforming and providing, in a balanced condition, a gap or nip having an even width all along the length of the cylinders.

Thus, it should be apparent that a single working condition of the refining device would exist, applying to the cylinders such a force or pressure providing an even gap or nip at each point between the laminating cylinders.

The components constituting the confectionery material mass are supplied to a kneading machine arranged upstream of the refining machine, for providing a paste-like and fluid mass suitable for processing by refining machines or devices (not shown).

The confectionery mass exiting the kneading device is pre-refined in order to reduce, at first, the granulometry of the particles thereof.

The confectionery mass pre-refining devices are usually adjusted to provide a consistency as constant as possible in the time. However, because of a variation of the components and of the processing conditions of the confectionery mass, said consistency will change in the time, thereby negatively affecting the subsequent refining process.

Actually, a variation of the mass consistency being refined causes a variation of the forces between the laminating cylinders of the refining devices, thereby changing the laminating nip or gap size thereof and, consequently, the refined product quality and amount.

For preventing such a laminating nip size variation from occurring, the distance or nip 11 between the two feeding cylinders 3 and 4 is measured, by a position transducer 31.

The electric signal 50 produced by the position transducer 31 is sent to the control unit 20 where, for example, it is conditioned and digitized. The size of the laminating nip 11 between the two first feeding cylinders 3, 4 is at first displayed. For example, the digitized signal 50 corresponding to the measurement of the feeding cylinder distance 11 is sent to a monitor which is operatively coupled to said control unit 20.

Alternately, the digitized signal 50 is sent to a digital display 100.

Said digitized signal 50, corresponding to the laminating nip 11, is compared with a signal $d_{12}$ corresponding to the reference distance of the two first cylinders 3, 4. From the comparison of the measured distance 11 and the reference distance $d_{12}$, a distance variation 51 to be sent to a first processor 101 or speed processor is defined.

The spreading-apart force 52 provided by the hydraulic device 24 urging the first swinging cylinder 3 against the second cylinder 4 is detected by the load cell 30.

The electric signal 53 produced by said load cell 30 is sent to said control unit 20, where it is conditioned and digitized.

The signal 53 proportional to the spreading apart force 52 is then displayed, for example, on a monitor operatively coupled to said control unit 20 or, alternately, on a display 54, said signal 53 being further fed to said speed processor 101.

During the refining method, or process, the operating conditions of the cylinder series following the first feeding cylinder 3 will tend to remain substantially constant, thereby providing a constant thickness of the product film exiting the laminating cylinders 4, 5, 6, 7.

Accordingly, the revolution speed V2 of the second feeding cylinder 4 will be held nearly constant through the overall refining process.

The revolution speed V2 of the second feeding cylinder 4, independently from the fact that it is preset in the control unit 20 or it is measured for example by a resolver (not shown), is then fed, as an electric signal 58, to the speed processor 52, for defining a rated revolution speed or rate V1 of the first feeding cylinder 3, allowing to recover the distance 11 between the feeding cylinders 3, 4, to the reference value $d_{12}$ thereof.

The revolution speed 60 of the first laminating cylinder 3 is measured by the resolver 43.

Thus a signal 61 proportional to said revolution speed 60 will be then sent to said control unit 20, where it will be displayed, for example on the display 62.

The electric signal 61 proportional to the revolution speed 60 of the first cylinder will be then compared against the speed signal V1 defined by the speed processor 52, thereby providing a speed variation 63 constituting the reference speed for a speed adjuster R1.

The speed adjuster R1 will provide a driving signal for the drive 45 of the motor reducing unit 15 operatively coupled to the shaft of the first feeding cylinder 3.

The speed processor 101 is operatively coupled to a temperature processor 102, thereby providing a signal indicative of a need of changing the temperature of the first two laminating cylinders, as the optimum refining conditions are changed.

The temperature of the confectionery mass being refined, which is proportional to the temperature of the cooling fluid provided in said laminating cylinders 3, 4, is measured by the temperature transducer 42, the corresponding electric signal 55 being supplied to said control unit 20 to be conditioned and digitized and then being supplied to the temperature processor 102, which is also fed with a signal 65 proportional to the optimum revolution speed (V10) of the first cylinder 3.

Thus the temperature processor 102 will provide a temperature signal 68 proportional to the temperature desired for the confectionery mass.

For example, the temperature microprocessor 102, upon detecting the electric signal 55 proportional to the temperature measured in the feeding cylinders, will add or subtract to/from the electrical signal 55 a signal proportional to a preset and modifiable value, thereby defining the signal 68 proportional to the new temperature or the temperature which is desired for the feeding cylinders.

The signal 68 proportional to the desired temperature is then compared with the signal 55 proportional to the measured temperature, thereby providing a reference signal 69 for a temperature adjuster R2, which will provide a control signal 70 for the drive 39 of said servovalves 37, 38 adjusting the temperature of the fluid supplied to the cooling device of the feeding cylinders 3, 4.

What is claimed is:

1. An arrangement for refining a viscous confectionery paste material, comprising:
   a) a housing having an inlet region for admitting confectionery material to be refined, and an outlet region for discharging refined confectionery material;
   b) a plurality of cylindrical refining rollers mounted for rotation in the housing between the inlet and outlet regions, for refining and conveying the confectionery material from the inlet region to the outlet region, including a pair of feed rollers rotatable at the inlet region about respective parallel axes of rotation, said feed rollers bounding between said axes a gap through which the confectionery material passes and exerts on the feed rollers a force tending to spread the feed rollers and enlarge the gap;
   c) a gap sensor for measuring the gap to obtain a measured gap;
   d) a force sensor for measuring the force to obtain a measured force; and
   e) a drive for rotatably driving one of the feed rollers at a variable speed of rotation dependent upon the measured gap and the measured force.

2. The arrangement of claim 1, wherein said one feed roller is mounted on the housing for pivoting movement; and further comprising a moving device for pivoting said one feed roller relative to the other of the feed rollers.

3. The arrangement of claim 2, wherein the moving device includes a hydraulic cylinder and a movable piston connected to said one feed roller.

4. The arrangement of claim 3, wherein the force sensor is a load cell mounted on the movable piston.

5. The arrangement of claim 1, wherein the gap sensor is a linear potentiometer arranged between the feed rollers.

6. The arrangement of claim 1, and further comprising an assembly for regulating temperature of said one feed roller, and a temperature sensor for measuring the temperature of said one feed roller to obtain a measured temperature; and wherein the variable speed of rotation of said one feed roller is also dependent upon the measured temperature of said one feed roller.

7. The arrangement of claim 6, wherein the assembly includes ductwork for passing a flowable medium of a desired temperature through said one feed roller.

8. The arrangement of claim 1, wherein the sensors produce electrical control signals indicative of the measured gap and the measured force; and wherein the drive includes a controller for processing the electrical control signals to obtain processed control signals, and an electrical motor operatively connected to said one feed roller for rotating said one feed roller as a function of the processed control signals.

9. The arrangement of claim 8, wherein the controller includes a gap comparator for comparing the measured gap with a reference gap to obtain a differential gap value.

10. The arrangement of claim 8, wherein the controller includes a display for displaying data.

11. The arrangement of claim 1, wherein the other of the feed rollers is maintained at a constant speed of rotation.

12. The arrangement of claim 1, wherein the other of the feed rollers and the others of the refining rollers are stacked one above another in vertical alignment.

* * * * *